UNITED STATES PATENT OFFICE.

HENRY M. HARTSHORN, OF MALDEN, MASSACHUSETTS.

IMPROVEMENT IN MANUFACTURING MALT LIQUORS.

Specification forming part of Letters Patent No. 220,023, dated September 30, 1879; application filed March 5, 1879.

*To all whom it may concern:*

Be it known that I, HENRY M. HARTSHORN, of Malden, in the county of Middlesex and State of Massachusetts, have made an invention of certain new and useful Improvements in the Art of Manufacturing Malt Liquors; and that the following is a full, clear, and exact description and specification of the same.

Previous to my present invention malt liquors have been manufactured from the materials known by the names of "wheat malt," "rye malt," and "barley malt," and also from these materials in connection with glucose and grape-sugar, or with cane sirups and sugar, and also in connection with Indian corn ground to meal or flour.

The system of manufacturing malt liquors from malt of the various kinds is objectionable—first, because of the expense attending such manufacture; second, because the malt contains only a small percentage of dextrine, which, by means of my invention, can be supplied in any desired quantity, and unmixed with any other deleterious substances.

The system of manufacturing malt liquors from malt of the various kinds in connection with glucose or grape-sugar hitherto practiced is objectionable, because such glucose or grape-sugar has contained either a quantity of unneutralized acid, used in its manufacture, or a quantity of sulphates resulting from the neutralization, or a quantity of the oily products of the corn, all of which substances are injurious in their effect upon the keeping quality of the malt liquors so manufactured.

The object of this invention is to reduce the cost of manufacturing malt liquors from malt of the various kinds in connection with Indian corn, maize, or other amylaceous substances, and to produce an article of superior quality.

To these ends the first part of my invention consists of a compound process, the first step or operation of which consists of the dry granulation of the corn, maize, or other substances, or reduction of the kernels by a dry clipping and cracking treatment, the effect of which is to reduce the kernels to coarse fragments, and to detach oil-containing portions of the kernel, in the form of hulls and fine matter, from the fragments.

The second step of the process consists of the dry purification of the granular starchy portions of the kernels from the detached oil-containing portions, which may be effected by sifting and winnowing the product of the first step, or by either of these operations, thereby removing the hulls and fine matter, and leaving the granular portions in a purified condition.

The third step of the process consists of the reduction of the purified granular product of the first and second operations to meal or flour, which is most readily effected by grinding it.

The fourth step of the process consists of the transformation of the starch of the corn obtained by the preceding three steps into a sweet liquor or wort by a treatment sufficient for that purpose.

The fifth step of the process consists of the mixture of the sweet liquor or wort obtained by the four preceding steps with the wort from the malt, obtained in the manner usually practiced by brewers, and the boiling together with the addition of hops, in the ordinary method.

The second part of my process consists of the new manufacture of improved depurated sweet liquor or wort obtained by the compound process which constitutes the first part of my invention.

I have found that the hulls and fine matter obtained by the first and second steps of the said process contain the bulk of the oily matter of the corn, while the coarser product separated from them contains all the practically valuable starch matters of the corn. Hence the advantages of my process are, first, that the oily portions of the Indian corn obtained by the first and second steps of the process are in a dry condition, in which state they may be kept for a length of time, and may be readily transported to a distant market for sale, instead of being liable to ferment and spoil, as they are when obtained by the liquid systems of separation, and this dry oil-containing matter obtained by my process approximates in value per pound that of the corn from which it is obtained, and its greater value than that of the wet products of the old processes reduces the cost of the malt liquors; secondly, the greater part of the oil-containing portion of the corn is separated by the dry treatment from the starchy portions before the latter are transformed into sweet liquor or wort, and I have found by experiment that a much larger portion of such sweet liquor or wort can be obtained from the starchy portions when thus freed, in whole or in part, from the oily portions than can be obtained by any of the ordinary processes, while at the same time my new process has the advantage of one of the old processes—of saving the free sugar of the corn.

The first and second steps of my compound process may proceed simultaneously upon the same mass of Indian corn, provided suitable mechanical means be provided; and in order that my invention may be fully understood, I will proceed to describe the manner in which I have practiced it with success. The Indian corn (shelled from the ear and winnowed) is subjected to the action of a cracking, hulling, and separating mill, (such, for example, as that described in the Wright patent of June 30, 1865.) By the action of this mill the kernels of the corn are hulled, clipped, and cracked, and the hull and fine clipped portions are separated from the granular cracked material. The purified or separated granular matter of the corn so obtained is then ground to meal or flour by means of ordinary millstones—such, for example, as those used for grinding flour. The corn meal or flour produced by the above two operations is subsequently transformed into sweet liquor or wort, and I prefer to employ diastase for that purpose, and to proceed as follows, viz: For each one hundred pounds of the above-mentioned corn-flour I find it expedient to use six pounds of rye malt and fifty gallons of soft water. The water is heated to a temperature of 90° Fahrenheit, or thereabout, and the malt, finely ground, is thoroughly mixed through the water by stirring. The corn flour is then stirred in, and the temperature is gradually raised, while the stirring is continued until the mass attains a temperature of 165° Fahrenheit. The time required to attain this temperature may be one and a half hour. The mass is maintained at this temperature for five hours, or thereabout, and the stirring is continued by preference during this period, although stirring is not essential. During this period the starch of the corn flour is transformed into sweet liquor or wort, and the specific gravity of the liquid should be about 7° Baumé, and should be tested by a saccharometer, to determine the condition of the sweet liquor. If the liquor attains this density before the completion of the period of five hours, the next step in the treatment may commence without waiting for the completion of the whole period, as but little more sweet liquor is obtained by continuing the application of heat after the above density is reached. The sweet liquor obtained as above is separated from the undissolved matters, and is then drawn off into suitable tanks, in which it should be maintained at a temperature of at least 130° Fahrenheit, or thereabout, until it is drawn into the boiler with the wort of the malt. The wort of the malt is obtained in the manner customary in ale or beer breweries, by placing the malt, properly ground or mashed, in a mash-tub provided with the usual stirring apparatus, upon which water is run at a proper temperature—say from 165° to 168° Fahrenheit—and allowed to stand until a thorough infusion is obtained. The wort is then drawn off through suitable pipes into the boiler, and the sweet liquor obtained from the corn-flour may be drawn into the boiler at the same time, until the liquor in the boiler attains the specific gravity desired, when the hops should be added, and after boiling together the compound liquor is drawn off into suitable tanks for fermentation.

After the compound liquor above described has undergone a proper fermentation it is drawn off into casks for use or sale.

The separation of the insoluble matter from the wort or sweet liquor obtained from the corn-flour may be effected by means of bag filters, such as those used for filtering solutions of sugar—and the solid residuum should be pressed to obtain the liquor with which it is saturated.

The process above described is not restricted to the use of a particular kind or exact quantity of malt for the conversion of the starch matters of the corn-flour, as barley malt may be used for the purpose, and the quantity of malt used may be varied as circumstances render expedient, the above-mentioned quantity of good malt being sufficient to produce a good result. Nor is the process restricted to the particular number of hours above mentioned for the performance of the several operations, because the time for performing each operation may be varied, as circumstances or the judgment of the manufacturers may render expedient. Nor is the process restricted to the maintenance of the heat till the liquor attains a density of 7° Baumé, as manufacturers may deem it unnecessary to wait until the liquor attains that density, and may proceed with the subsequent steps sooner.

The several steps of my compound process may be conveniently effected in the same establishment; but this is not essential, because the products of the first, second, and third steps are in a dry state, and therefore the valuable starchy matter may be packed and transported either in the condition of grain or that of corn meal or flour any desired distance. Hence the first step of the compound process, or the first and second steps, or the first, second, and third steps, may be practiced in establishments different from those in which the subsequent steps are performed. This circumstance is of great practical advantage, as the first steps may be performed in the great corn-producing regions of the country, and the dry and oil-containing matters separated by the first and second steps may be used for feed for live stock, while the flour may be transported to the place of consumption, and the process may be completed there.

From the foregoing description it appears that my new process differs substantially from preceding processes for the production of malt liquors, in the respect that according to those by which they were produced by a mixture of corn-meal with the malt, the grain was reduced directly to meal or flour, whereas according to mine the reduction to meal or flour is preceded by the dry granulation of the kernels and the dry purification of the granular starchy portions thereof from light and fine oil-containing portions of the grain.

My new product differs also from the products of those anterior processes in which were manufactured malt liquors by the use of malt and glucose or grape-sugar manufactured by means of sulphuric acid, in the respect that, so far as I know, those products always contain either unneutralized acid or the sulphates resulting from the neutralization; and my product differs also from the product of those anterior processes, in which were used corn reduced directly to meal or flour, in the respect that, so far as I know, those products always contain deleterious oily and glutinous matters, (or the products of malt upon them;) and my product differs also from that of any anterior process, in the respect that the malt liquors produced by it contain a larger percentage of pure dextrine, uncontaminated by deleterious matters, than can be obtained by any other process.

It is well known that while grape-sugar will ferment readily and rapidly, the fermentation of dextrine is very slow, and as a matter of practical experience I have found that after the conversion by fermentation of substantially the whole of the grape-sugar of the wort into alcohol, the fermentation still continued slowly working upon the dextrine. This fermentation is sufficient to supply carbonic-acid gas in quantities sufficient to prevent the entrance of the oxygen through the pores of the cask, and the consequent spoiling of the liquor.

I claim as my invention—

1. The process substantially herein set forth of producing malt liquors practically free from deleterious oily matters, and including the free sugar of the corn, and also a large percentage of dextrine, consisting of the following operations, viz: first, granulating the corn in the dry state to detach oil-containing portions from the starchy portions of the grain, leaving the latter in a granular state; second, purifying the dry granular starchy portions from light and fine oil-containing portions; third, reducing the purified granular starchy portions to flour; fourth, transforming the starch of the corn-flour into a sweet liquor or wort; fifth, mixing the sweet liquor so produced with the wort of malt as produced in breweries, and converting the compound liquor so produced into malt liquors by fermentation.

2. The process, substantially as before set forth, of producing malt liquors practically free from deleterious oily matters and foreign sulphates, and including the free sugar of the corn, consisting of the following operations, viz: first, granulating the corn in the dry state to detach oil-containing portions from the starchy portions of the grain, leaving the latter in a granular state; second, purifying the dry granular starchy portions from light and fine oil-containing portions; third, reducing the purified granular starchy portions to flour; fourth, transforming the starch of the corn-flour into sweet liquor by the diastase treatment; fifth, mixing the sweet liquor so produced with the wort of malt as produced in breweries; and, finally, converting the compound liquor so produced into malt liquors by fermentation.

Witness my hand this 1st day of February, 1879.

HENRY M. HARTSHORN.

Witnesses:
FRED. W. EATON,
JAMES F. EATON.